United States Patent
Lee

(10) Patent No.: US 6,947,744 B2
(45) Date of Patent: Sep. 20, 2005

(54) CALL DISTRIBUTION METHOD IN A MOBILE SWITCHING SYSTEM

(75) Inventor: Kwang-Bae Lee, Daegu-Kwangyokshi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 811 days.

(21) Appl. No.: 09/739,796

(22) Filed: Dec. 20, 2000

(65) Prior Publication Data

US 2001/0005678 A1 Jun. 28, 2001

(30) Foreign Application Priority Data

Dec. 22, 1999 (KR) .................................. P1999-60153

(51) Int. Cl.⁷ ................................................ H04Q 7/20
(52) U.S. Cl. ...................... 455/433; 455/433; 455/434; 455/452; 455/453
(58) Field of Search ............................... 455/433, 434, 455/452, 453, 445, 432, 435, 458; 380/43, 48, 49

(56) References Cited

U.S. PATENT DOCUMENTS

| | | | |
|---|---|---|---|
| 5,241,598 A | * | 8/1993 | Raith .......................... 380/248 |
| 5,400,390 A | | 3/1995 | Salin |
| 5,428,665 A | | 6/1995 | Lantto |
| 5,841,854 A | | 11/1998 | Schumacher et al. |
| 5,844,522 A | | 12/1998 | Sheffer et al. |
| 5,915,212 A | | 6/1999 | Przelomiec et al. |
| 5,920,814 A | | 7/1999 | Sawyer et al. |
| 6,064,887 A | * | 5/2000 | Kallioniemi et al. ....... 455/445 |
| 6,078,575 A | * | 6/2000 | Dommety et al. .......... 370/338 |
| 6,081,705 A | | 6/2000 | Houde et al. |
| 6,097,950 A | | 8/2000 | Bertacchi |
| 6,119,012 A | | 9/2000 | Amirijoo |
| 6,134,316 A | * | 10/2000 | Kallioniemi et al. .. 379/220.01 |
| 6,134,435 A | | 10/2000 | Zicker et al. |
| 6,144,671 A | | 11/2000 | Perinpanathan et al. |
| 2002/0086671 A1 | * | 7/2002 | Amin et al. ................. 455/432 |

* cited by examiner

*Primary Examiner*—Emmanuel L. Moise
*Assistant Examiner*—Julio Perez
(74) *Attorney, Agent, or Firm*—Robert E. Bushnell, Esq.

(57) ABSTRACT

A mobile switching system distributes location registration and mobile subscriber's outgoing call using a plurality of managed intelligence nodes (MINs) having a call server function. Upon receipt of a location registration or outgoing call request from a subscriber, a Mobile Switching Center (MSC) transmits a location registration or outgoing call request message to a corresponding one of the managed intelligence nodes. Upon receipt of the location registration or outgoing call request message, the corresponding managed intelligence node reads a mobile identification of a calling party and searches the mobile identification for a target managed intelligence node address. When the target managed intelligence node address is searched, the managed intelligence node determines whether a target prefix is a converted prefix having a target managed intelligence node prefix head digit, and immediately performs a location registration or outgoing call process, when the target prefix is the converted prefix.

23 Claims, 4 Drawing Sheets

CALL DISTRIBUTION METHOD IN A MOBILE SWITCHING SYSTEM

CLAIM OF PRIORITY

This application makes reference to, incorporates the same herein, and claims all benefits accruing under 35 U.S.C. §119 from an application entitled The Method of Call Distribution in a Next-Generation Mobile Switching System earlier filed in the Korean Industrial Property Office on 22 Dec. 1999, and there duly assigned Ser. No. 99-60153 by that Office.

BACKGROUND OF THE INVENTION

1. Field of the Invention

The present invention relates generally to a call distribution method in a mobile switching system, and in particular, to a call distribution method for distributing location registration and mobile subscriber's outgoing call using a plurality of managed intelligence nodes (MINs) having a call server function in a mobile switching system.

2. Description of the Background Art

Generally, a mobile switching system performs location registration and call processing of a mobile subscriber in one mobile switching center (MSC). Thus, an increase in number of the mobile subscribers causes an overload of the system, making it difficult to provide a rapid service. Therefore, there has been a demand for an improved mobile switching system in which the mobile switching center performs only the switching function and processes various call processing functions including visitor location register (VLR) information by using a plurality of managed intelligence nodes (MINs) included therein.

The mobile switching center manages the routing of calls in a large service area. The mobile switching center is sometimes also called a mobile telephone switching office (MTSO). The mobile switching center may connect the cellular base stations and the mobiles to a public switched telephone network (PSTN). The public switched telephone network is a telephone network that has connections established when required. The telephone network is controlled by one or more entities to provide telephone service available to the public. Each mobile user communicates via radio with one of the base stations and may be switched to a number of base stations throughout a call as the mobile user moves through a service area. The base stations may have multiple transmitters and receivers to connect a call between the mobile user and a public telephone network. The base station links between the mobile user and the mobile switching center.

Generally, as an example, when a telephone call is placed to a mobile user, the mobile switching center dispatches the request to all base stations in the mobile telephone system. The mobile identification number is then communicated over all of the control channels of the mobile telephone system. The mobile identification number may be the mobile user's telephone number. The mobile user transmits a verification of the mobile identification number to the base station which then forwards the verification to the mobile switching center. The call is forwarded to the mobile user. The mobile switching center may make the proper adjustments in such items for example frequency, channel selection, transmission power, etc. As the call is in progress, the mobile switching center may perform a handoff which is the adjustment of the channel of the mobile unit and base stations so that the signal quality is maintained while the user or subscriber moves in and out of range of each base station. When a mobile unit originates a call, a call initiation request is sent having such information as the telephone number of the mobile unit, the serial number of the mobile unit, and the telephone number of the party being called. The mobile switching center validates the request and forwards the connection to the called party through the public switched telephone network (PSTN) and instructs the base station and mobile unit that the telephone connection may begin.

The mobile switching center may use databases such as the home location register (HLR), the visitor location register (VLR), and the authentication center (AUC) to update location and registration records for all subscribers in the network. A mobile subscriber becomes a roaming subscriber when it leaves the coverage area of the mobile switching center to which it was originally subscribed (home mobile switching center). To allow access to the public switched telephone is network to the roaming subscriber, the roaming subscriber is required to register with the mobile switching center in which the roaming subscriber presently resides. The mobile switching center used by the roaming subscriber can be called a visitor mobile switching center. Registration is a process where each roaming subscriber notifies the mobile switching center servicing the roaming subscriber of the presence of the roaming subscriber and the location. The registration is transferred to the home mobile switching center where the home location register is updated. The home register contains a list of all users along with information such as their mobile identification number who originally subscribed to the network in that particular region. The visitor location register (VLR) changes over time the list of users who have roamed into a particular area of the network. The mobile switching center updates the visitor location register by first determining that the users are roamers. Because billing rates for roaming may vary, it is important to verify the roaming mobile users. The mobile switching center can verify whether a user is a roaming subscriber by the mobile identification number of a user with the mobile identification numbers contained in the home location register.

Exemplars of the art are U.S. Pat. No. 5,841,854 issued to Schumacher et al. for Wireless Telephone Integration System and Method for Call Centers and Workgroups, U.S. Pat. No. 6,144,671 issued to Perinpanathan et al. for *Call Redirection Methods in a Packet Based Communications Network*, U.S. Pat. No. 5,915,212 issued to Przelomiec et al. for System and Method for Achieving Extended Radio Coverage and Additional Capacity Using Extended Frequency Bands, U.S. Pat. No. 5,400,390 issued to Salin for Method for Establishing an Inbound Call to the Mobile Telephone in a GSM Cellular Mobile Telephone Network, U.S. Pat. No. 5,428,665 issued to Lantto for Method of Managing Supplementary Service Procedures in Gsm/vlr Towards Hlr, U.S. Pat. No. 5,920,814 issued to Sawyer et al. for System and Method of Managing Temporary Mobile Station Identity (TMSI) Parameters in a Radio Telecommunications Network, U.S. Pat. No. 6,097,950 issued to Bertacchi for Method and System for Global Roaming in a Cellular Telecommunications System, U.S. Pat. No. 6,081,705 issued to Houde et al. for Cellular Telephone Network Support of International Mobile Station Identity (IMSI), U.S. Pat. No. 5,844,522 issued to Sheffer et al. for Mobile Telephone Location System and Method, U.S. Pat. No. 6,134,435 issued to Zicker et al. for Cellular Radiotelephone System with Remotely Programmed Mobile Stations, and U.S. Pat. No. 6,119,012 issued to Amirijoo for Method and System for Dynamically and Periodically Updating Mobile Station Location Data in a Telecommunications Network. I have found that the art does not show a method for performing rapid call distribution by distributing a signaling interfacing and switching function and a call control function in a mobile switching system.

SUMMARY OF THE INVENTION

It is, therefore, an object of the present invention to provide a method for performing rapid call distribution by distributing a signaling interfacing and switching function and a call control function in a mobile switching system.

It is another object to have a method quickly and efficiently processing a large volume of calls in an efficient and rapid manner.

It is yet another object to have a method of distributing location registration and mobile subscriber's outgoing call using a plurality of managed intelligence nodes.

It is still yet another object to have a system that quickly and efficiently processes roaming subscribers especially when call volume is high in any given service area.

To achieve the above and other objects, there is provided a method for distributing a call in a mobile switching network having a mobile switching center (MSC) for performing a signaling interfacing and switching function and a plurality of managed intelligence nodes (MINs) including a visitor location register (VLR) as a call server for performing a unified call control function. Upon receipt of a location registration request from a subscriber, the mobile switching center transmits a location registration request message to a corresponding one of the managed intelligence nodes. Upon receipt of the location registration request message, the corresponding managed intelligence node reads a calling party's mobile identification (ID) and searches the mobile identification for a target managed intelligence node address. When the target managed intelligence node address is searched, the managed intelligence node determines whether a target prefix is a converted prefix having a target managed intelligence node prefix head digit, and immediately performs a location registration process, when the target prefix is the converted prefix.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
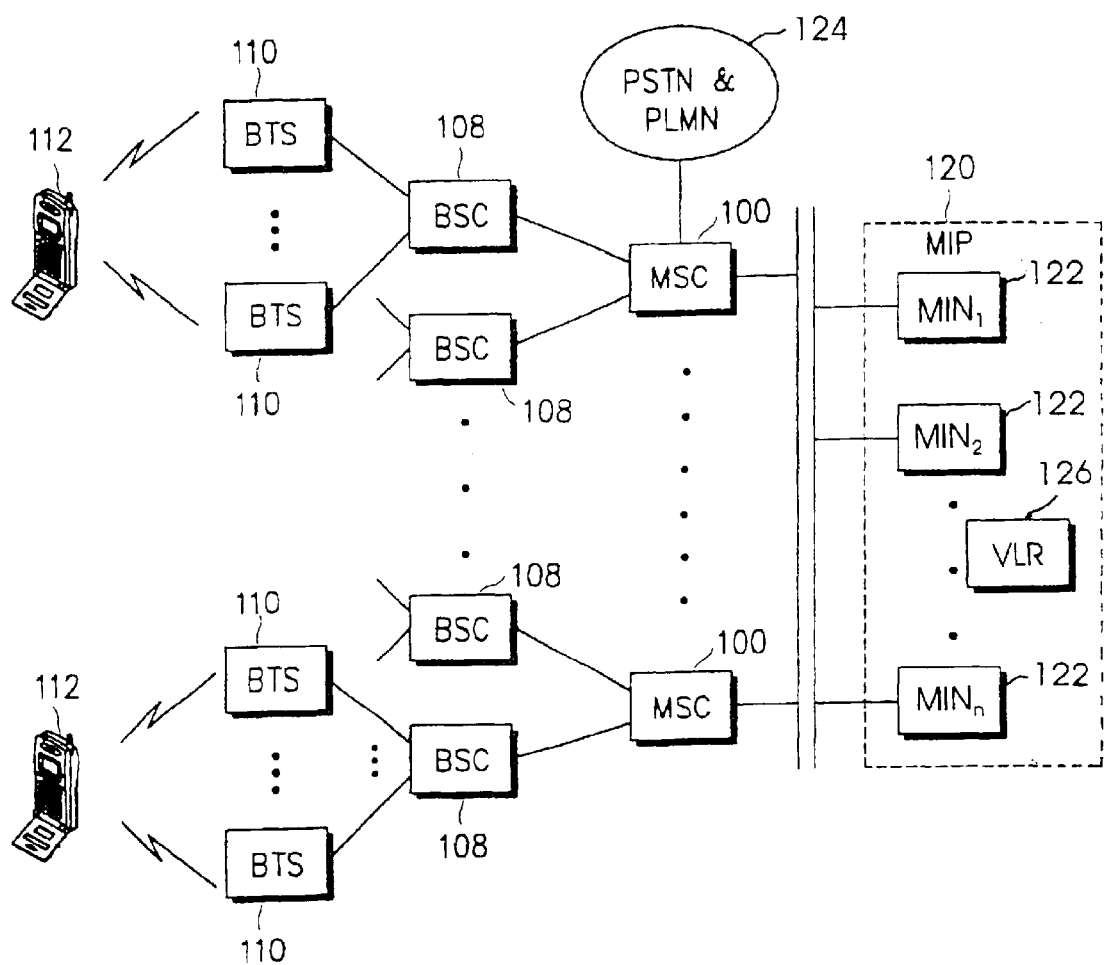
FIG. 1 is block diagram illustrating a future mobile switching system according to an embodiment of the present invention.

Referring to FIG. 1, the mobile switching network includes a plurality of mobile switching centers 100, a managed intelligence platform (MIP) 120 including a plurality of managed intelligence nodes 122, $MIN_1$–$MIN_n$, a plurality of base station controllers (BSCs) 108, and a plurality of base transceiver subsystem (BTSs) 110 connected to each base station controller 108. A plurality of mobile telephones 112 are wirelessly connected to a public switched telephone network (PSTN) and a public land mobile network (PLMN) 124. The base station controller 108 performs a wire and wireless link control function and a handoff function. The base transceiver subsystem 110 forms a wireless communication path to the mobile terminals 112, and manages radio resources. The mobile switching center 100 performs the signaling interfacing and switching function. Here, a common mobile switching center or an ATM (asynchronous transfer mode) exchange can be used for the mobile switching center (or trunk interface) 100. The managed intelligence platform (MIP) 120 has a plurality of managed intelligence nodes 122, $MIN_1$–$MIN_n$, and includes a VLR (visitor location register) 126 as a call server for performing a unified call control function. A function of the visitor location register 126 can be assigned to the managed intelligence node in case of combining the mobile switching center and visitor location register configuration. The mobile switching center (MSC) 100 basically provides a switching fabric. In other words, the mobile switching center is a media gateway. In the media gateway point of view, the managed intelligence platform (MIP) 120 is a kind of a mobile switching center server. Therefore, a managed intelligence platform (MIP) 120 containing managed intelligence nodes (MINs) can possibly control multiple mobile switching centers (MSCs) 100 or just one mobile switching center 100.

A managed intelligence node (MIN) 122 can be physically realized for example as a workstation. As an example, the managed intelligence node 122 can be a kind of a processor of a multi-processor system. However, the managed intelligence node 122 has only the mobile switching center 100 server related functionality that excludes direct device handling functions.

Figures 2, 3:
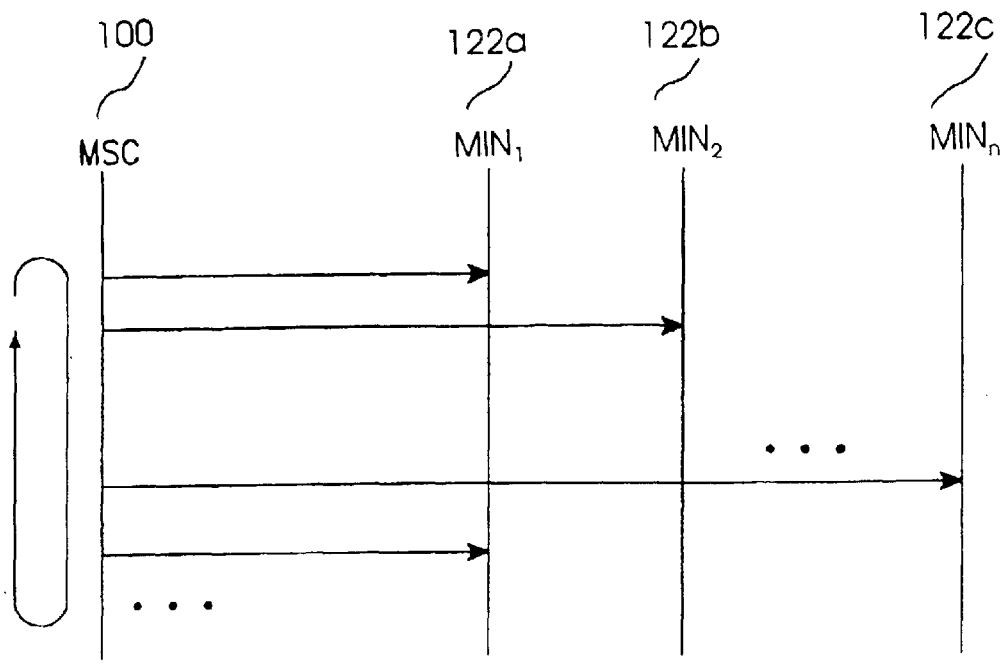
FIG. 2 is a diagram illustrating a method for distributing managed intelligence nodes on a round robin basis according to an embodiment of the present invention.
FIG. 3 is a diagram illustrating a prefix MIN (managed intelligence node) routing table according to an embodiment of the present invention.

Referring to FIG. 2, in an exemplary embodiment of the present invention, an initial request of the mobile switching center 100 for routing according to the managed intelligence nodes 122 is made using a round robin (or cyclic distribution) method, in order to reduce a load on a specific managed intelligence node 122 in a managed intelligence node group. This is a method for processing initial messages for location registration and outgoing call request, received according to a distribution rule of the mobile switching center according to the present invention. For example, as seen in FIG. 2, routing by the mobile switching center first made according to $MIN_1$ 122a, the $MIN_2$ 122b, until finally the last $MIN_n$ 122c. After $MIN_n$ 122c, the process cycles back to $MIN_1$ 122a. A typical prefix managed intelligence node routing table for distributing a process request to the managed intelligence nodes 122 is shown in FIG. 3, and a data work of this table can be manipulated by the operator.

The routing table of FIG. 3 is used to determine which managed intelligence node 122 actually processes an initial message received at the managed intelligence nodes 122, such as location registration or outgoing call request message transmitted from the mobile switching center 100 to the base station controller 108. Prefix 124 and call managed intelligence node address data out 126 of the managing elements can be generated and managed by the system operator, and a managed intelligence node status 128 is associated with a maintenance function for call processing managed intelligence node status management during an on-line operation. This table is implemented so as to have the elements shown in FIG. 3 regardless of an object oriented database (OODB) and a relation database (RDB). The prefix data is obtained by removing a service provider identification number MIN2 (mobile identification number 2) from the whole field of a mobile identification (ID) of the mobile subscriber. The MIN2 (mobile identification number 2) is a part of the mobile identification (ID) field that does not include the numbers actually pressed by a subscriber like the mobile country code and the mobile network code. The mobile identification (ID) consists of some sub-fields. The fields are divided according to a specific length. For instance, normally the MIN1 (mobile identification number 1) which is the pure mobile number in a certain service provider's database can be obtained after removing the provider identification number (MIN2). The prefix data is for example 3 or 4 digits of the pure mobile number (MIN1) field. The number of the pure mobile number (MIN1) digits is defined according to the numbering plan of the service provider.

For example, in the national public land mobile network (PLMN), this refers to 3 digits corresponding to a prefix out of the remaining 7 digits. It means that only the subscribers in the prefix defined in the visitor location register table of the corresponding managed intelligence node 122 can store the prefix and managed intelligence node information. However, if the corresponding call processing managed intelligence node group controls several different service providers, it is possible to fill a corresponding prefix field with 6-digit information including the MIN2.

Stated in another way, a mobile station may have a ten digit mobile identification number that a subscriber dials. The mobile identification number includes a seven digit local number which is the MIN1 (mobile identification number 1) and the three digit area code which is the MIN2 (mobile identification number 2).

Figure 4:
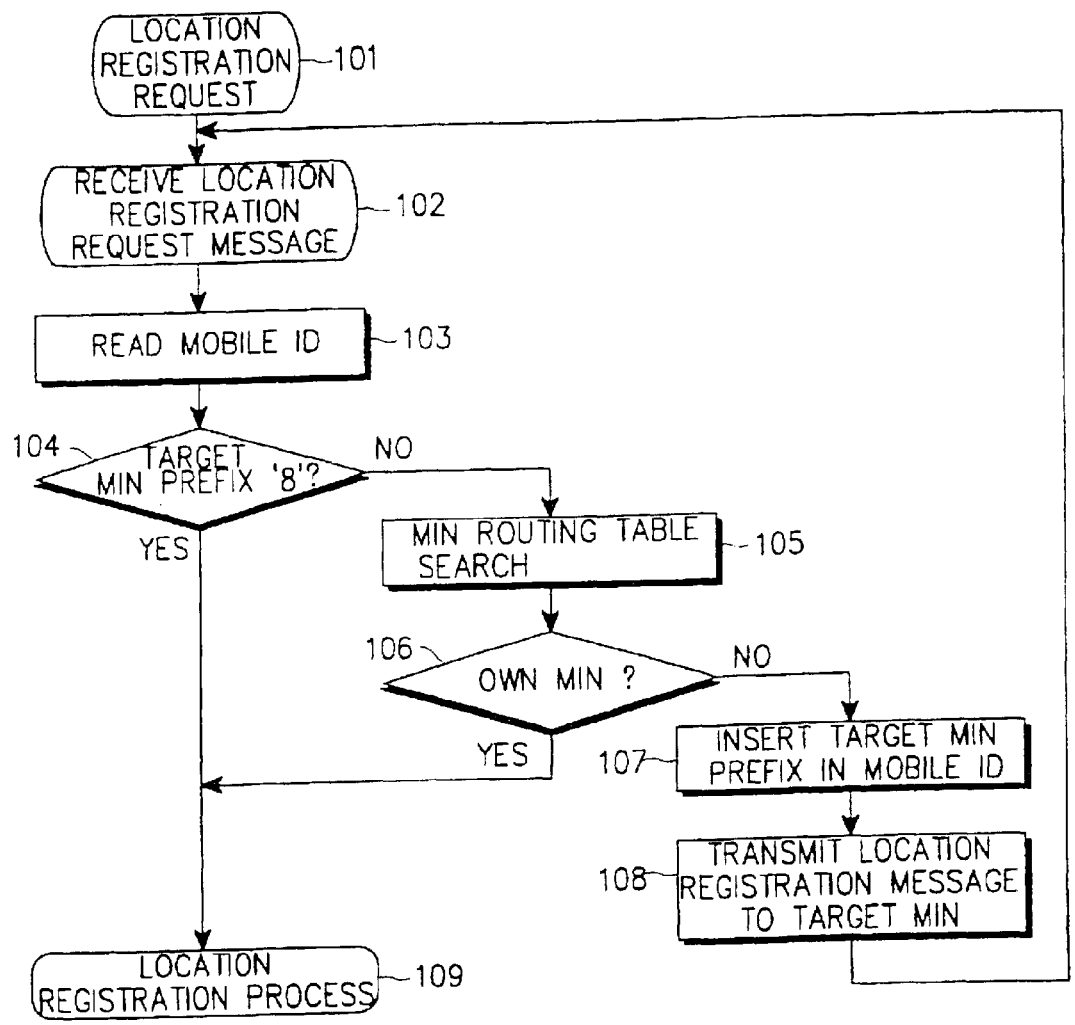
FIG. 4 is a flow chart illustrating a procedure for processing a multi-managed intelligence node routing module for location registration according to an embodiment of the present invention.

Referring to FIG. 4, the mobile switching center 100 sends a location registration request so message to the managed intelligence nodes 122 of $MIN_1$–$MIN_n$, e.g., to a managed intelligence node distributed by the round robin method in step 101. The distributed managed intelligence node then receives the location registration request message in step 102. Thereafter, the corresponding managed intelligence node reads a calling party's mobile identification in step 103 and determines in step 104 whether the corresponding target prefix is a converted prefix having a target managed intelligence node prefix head digit "8" for example. If the target prefix is not the converted prefix, the managed intelligence node searches a target managed intelligence node address indicated by a prefix value received from the managed intelligence node routing table of FIG. 3, in step 105. Thereafter, in step 106, the managed intelligence node determines whether the searched managed intelligence node address is its own managed intelligence node address. If the searched managed intelligence node address is its own managed intelligence node address, the managed intelligence node performs a location registration process in step 109. Otherwise, if the searched managed intelligence node address is not its own managed intelligence node address, the managed intelligence node converts a managed intelligence node prefix head digit of the mobile identification prefix field to "8" in step 107. That is, the target managed intelligence node prefix is inserted (or filled) in the mobile identification. Thereafter, the managed intelligence node transmits the location registration message to the target managed intelligence node in step 108 and then returns to step 102. However, if it is determined in step 104 that the corresponding prefix is the target managed intelligence node prefix head digit "8", the managed intelligence node proceeds to step 109 to perform the location registration process.

Figure 5:
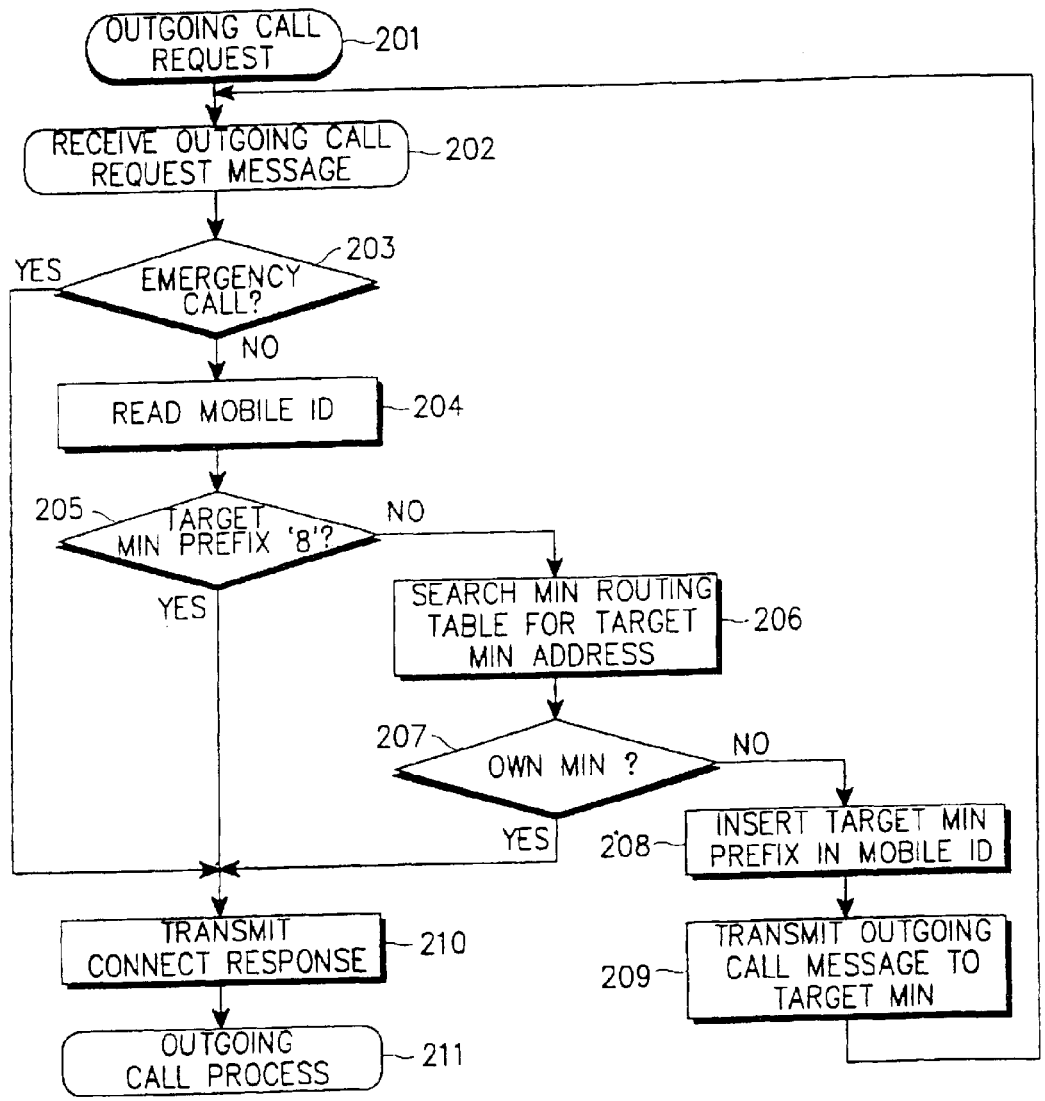
FIG. 5 is a flow chart illustrating a procedure for performing a mobile subscriber's call processing routine according to an embodiment of the present invention.

Referring to FIG. 5, the mobile switching center 100 sends an outgoing call request message to the managed intelligence nodes, $MIN_1$–$MIN_n$, e.g., to a managed intelligence node distributed by the round robin method in step 201. The distributed managed intelligence node then receives the outgoing call request message in step 202, and determines in step 203 whether it is an emergency call. If it is an emergency call, the managed intelligence node proceeds to step 210 and sends a connect response. Thereafter, the managed intelligence node performs an outgoing call process in step 211. Otherwise, if it is not an emergency call, the managed intelligence node reads the calling party's mobile identification in step 204 and determines in step 205 whether the corresponding target prefix is a converted prefix having the target managed intelligence node prefix head digit "8" for example. If the target managed intelligence node prefix is not the converted prefix, the managed intelligence node searches the target managed intelligence node address indicated by a prefix value received from the managed intelligence node routing table of FIG. 3 in step 206. Thereafter, in step 207, the managed intelligence node determines whether the searched managed intelligence node address is its own managed intelligence node address. If the searched managed intelligence node address is its own managed intelligence node address, the managed intelligence node sends the connect response in step 210 and then performs the outgoing call process in step 211. Otherwise, if the searched managed intelligence node address is not its own managed intelligence node address, the managed intelligence node converts the managed intelligence node prefix head digit of the mobile identification prefix field to "8" in step 208. That is, the target managed intelligence node prefix is inserted in the calling party's mobile identification. Subsequently, the managed intelligence node transmits the outgoing call request message to the target managed intelligence node in step 209 and then returns to step 202. However, if it is determined in step 205 that the corresponding prefix is the target managed intelligence node prefix head digit '8', the managed intelligence node sends the connect response in step 210 and then performs the outgoing call process in step 211.

As described above, the future mobile switching network according to the present invention includes a mobile switching center which is a switch fabric for performing the signaling interfacing and switching function and a managed intelligence platform (MIP) including the visitor location register serving as a call server for performing a unified call control function, so as to efficiently distribute the mobile subscriber's location registration and outgoing call request messages received from the mobile switching center to the other managed intelligence nodes in association with the visitor location register included in the managed intelligence node, thereby increasing the call processing capability.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for distributing a call in a mobile switching network, comprising the steps of:

transmitting a location registration request message from a mobile switching center to a corresponding at least one of a plurality of managed intelligence nodes in accordance with a predefined distribution rule upon receipt of a location registration request from a subscriber, the mobile switching center performing a signaling interfacing and switching function, the plurality of managed intelligence nodes including a visitor location register as a call server for performing a unified call control function;

reading in the corresponding managed intelligence node a mobile identification of the subscriber making a call and searching the mobile identification for a target managed intelligence node address upon receipt of the location registration request message, the target managed intelligence node corresponding to a target subscriber being called by the subscriber; and determining whether a target prefix is a converted prefix having a prefix head digit of the target managed intelligence node when the target managed intelligence node address is searched, and immediately performing a location registration process when the target prefix is the converted prefix.

2. The method as claimed in claim 1, further comprising the steps of:

determining by the corresponding managed intelligence node whether the searched managed intelligence node address is its own managed intelligence node address when the target prefix is not the converted prefix; and performing the location registration process, when the searched managed intelligence node address is its own managed intelligence node address.

3. The method as claimed in claim 2, further comprising the step of inserting the target managed intelligence node prefix in the mobile identification and transmitting a location registration message to the target managed intelligence node when the searched managed intelligence node address is not the corresponding managed intelligence node's own managed intelligence node address.

4. The method as claimed in claim 3, with the mobile switching center being an asynchronous transfer mode exchange.

5. The method as claimed in claim 3, with the prefix data obtained by removing a service provider identification number from the whole field of the mobile identification of the subscriber.

6. The method as claimed in claim 1, further comprising the step of searching a target managed intelligence node address indicated by a prefix value received from a routing table of the managed intelligence node by the corresponding managed intelligence node when the target prefix is not the converted prefix.

7. A method for distributing a call in a mobile switching network, comprising the steps of:

transmitting an outgoing call request message from a mobile switching center to a corresponding at least one of the managed intelligence nodes in accordance with a predefined distribution rule accommodating reducing a load on a specific managed intelligence node, upon receipt of an outgoing call request from a subscriber, the mobile switching center performing a signaling interfacing and switching function, the plurality of managed intelligence nodes including a visitor location register as a call server for performing a unified call control function;

reading in the corresponding managed intelligence node a mobile identification of a calling subscriber to search a target managed intelligence node address upon receipt of the outgoing call request message; and determining whether a target prefix is a converted prefix having a target managed intelligence node prefix head digit when the target managed intelligence node address is searched, and transmitting a connect response and performing an outgoing call process, when the target prefix is the converted prefix.

8. The method as claimed in claim 7, further comprising the steps of:

determining by the corresponding managed intelligence node whether the searched managed intelligence node address is its own managed intelligence node address when the target prefix is not the converted prefix; and performing the outgoing call process when the searched managed intelligence node address is its own managed intelligence node address.

9. The method as claimed in claim 8, further comprising the step of inserting the target managed intelligence node prefix in the mobile identification and transmitting the outgoing call request message to the target managed intelligence node when the searched managed intelligence node address is not its own managed intelligence node address.

10. The method as claimed in claim 9, further comprising the step of performing the outgoing call process after transmitting a connect response when the requested outgoing call is an emergency call.

11. The method as claimed in claim 10, further comprising of searching of the target managed intelligence node address indicated by a prefix value received from a routing table of the managed intelligence node by the corresponding managed intelligence node.

12. The method as claimed in claim 7, further comprising the step of searching a target managed intelligence node address indicated by a prefix value received from a routing table of the managed intelligence node by the corresponding managed intelligence node when the target prefix is not the converted prefix.

13. An apparatus, comprising:

a mobile unit accommodating a reception and transmission of information;

a base transceiver forming wireless communication path to the mobile unit, the base transceiver having a controller performing a wire and wireless link control function and a handoff function;

a mobile switching center routing calls between subscribers of the mobile unit and a telephone network, the mobile switching center performing a signaling interfacing and switching function;

a first managed intelligence node having the mobile switching center routing calls between the mobile unit and a telephone network according to the managed intelligence node; and a second managed intelligence node, with one of the managed intelligence nodes receiving a location registration request message from a mobile switching center upon receipt of a location registration request from a subscriber, the mobile switching center performing a signaling interfacing and switching function, the two managed intelligence nodes including a visitor location register as a call server for performing a unified call control function, the one of the managed intelligence nodes reading a mobile identification of the subscriber making a call and searching the mobile identification for a target managed intelligence node address upon receipt of the location registration request message, the target managed intelligence node corresponding to a target subscriber being called by the subscriber, the one of the managed intelligence nodes determining whether a target prefix is a converted prefix having a prefix head digit of the target managed intelligence node when the target managed intelligence node address is searched, and immediately performing a location registration process when the target prefix is the converted prefix.

14. The apparatus of claim 13, with the mobile switching center requesting cyclically each one of the managed intelligence nodes, the cyclic request reducing the load on a specific managed intelligence node.

15. The apparatus of claim 14, with the one of the managed intelligence nodes determining whether the searched managed intelligence node address is its own managed intelligence node address when the target prefix is not the converted prefix and performing the location registration process when the searched managed intelligence node address is its own managed intelligence node address.

16. The apparatus of claim 15, with the one of the managed intelligence nodes inserting the target managed intelligence node prefix in the mobile identification and transmitting a location registration message to the target managed intelligence node when the searched managed intelligence node address is not its own managed intelligence node address.

17. The apparatus of claim 14, with one of the managed intelligence nodes receiving an outgoing call request message from a mobile switching center upon receipt of an outgoing call request from a subscriber, the two managed intelligence nodes including a visitor location register as a call server for performing a unified call control function, the one of the managed intelligence nodes reading mobile identification of a calling subscriber to search a target managed intelligence node address upon receipt of the outgoing call request message, the one of the managed intelligence node determining whether a target prefix is a converted prefix having a target managed intelligence node prefix head digit when the target managed intelligence node address is searched, and transmitting a connect response and performing an outgoing call process, when the target prefix is the converted prefix.

18. The apparatus of claim 17, with the one of the managed intelligence nodes determining whether the searched managed intelligence node address is its own managed intelligence node address when the target prefix is not the converted prefix and performing the outgoing call process when the searched managed intelligence node address is its own managed intelligence node address.

19. The apparatus of claim 18, with the one of the managed intelligence nodes inserting the target managed intelligence node prefix in the mobile identification and transmitting the outgoing call request message to the target managed intelligence node when the searched managed intelligence node address is not its own managed intelligence node address.

20. The apparatus of claim 19, with the one of the managed intelligence nodes performing the outgoing call process after transmitting a connect response when the requested outgoing call is an emergency call.

21. The apparatus of claim 17, with the prefixes, managed intelligence node addresses, and a status of each one of the managed intelligence nodes accommodating manual control by an operator.

22. The apparatus of claim 14, further comprising a visitor location register as a call server performing unified call control function.

23. The apparatus of claim 14, with the mobile switching center being an asynchronous transfer mode exchange.

\* \* \* \* \*